United States Patent [19]

Sällberg et al.

[11] Patent Number: 5,555,264
[45] Date of Patent: Sep. 10, 1996

[54] METHODS AND DEVICES FOR PRIORITIZING IN HANDLING BUFFERS IN PACKET NETWORKS

[75] Inventors: Hans K. M. Sällberg, Lund, Sweden; Soren Blaabjerg, Allerod, Denmark

[73] Assignee: Telefoanktiebolaget LM Ericsson, Stockholm, Sweden

[21] Appl. No.: 307,611

[22] PCT Filed: Mar. 22, 1993

[86] PCT No.: PCT/SE93/00237

§ 371 Date: Nov. 14, 1994

§ 102(e) Date: Nov. 14, 1994

[87] PCT Pub. No.: WO93/19551

PCT Pub. Date: Sep. 30, 1993

[30] Foreign Application Priority Data

Mar. 20, 1992 [SE] Sweden .................. 9200868

[51] Int. Cl.$^6$ ...................................... H04L 12/56
[52] U.S. Cl. ............................ 370/17; 370/60.1; 370/61; 370/85.6
[58] Field of Search ............................ 370/13, 17, 58.1, 370/58.2, 58.3, 60, 60.1, 61, 85.6, 94.1, 94.2; 340/825.06, 825.5, 825.51; 371/5.1, 5.5

[56] References Cited

U.S. PATENT DOCUMENTS

| 5,130,978 | 7/1992 | Mobasser | 370/60 |
| 5,267,232 | 11/1993 | Katsube et al. | 370/17 |
| 5,278,530 | 1/1994 | Kudo | 370/94.1 |
| 5,278,828 | 1/1994 | Chao | 370/85.6 |
| 5,359,592 | 10/1994 | Corbalis et al. | 370/17 |
| 5,361,252 | 11/1994 | Sallberg et al. | 370/17 |
| 5,390,176 | 2/1995 | Schoute et al. | 370/60.1 |

*Primary Examiner*—Alpus H. Hsu
*Attorney, Agent, or Firm*—Burns, Doane, Swecker & Mathis, L.L.P.

[57] ABSTRACT

Methods and devices for handling a buffer in packet networks, particularly in regard of loss and delay of packets, which belong to predetermined or implicitly given loss priority classes and delay priority classes. When a packet arrives at the buffer, its loss priority and delay priority classes are determined. For each loss priority class, there is a predetermined threshold value, and a total filling level of the buffer, i.e., the total number of packets stored, is compared to the threshold value of the packet's loss priority class. If the threshold value is larger than the total filling level, the packet is buffered in order to be forwarded; otherwise, the packet is lost. In determining whether a packet is to be buffered or lost, the packet's delay priority is not taken into account. In forwarding packets from the buffer, those packets that belong to higher delay priority classes are chosen in the usual way before packets belonging to lower delay priority classes. This is done such that packets belonging to all delay priority classes can be warranted a specific minimum service level by associating each such class with a maximum time period, within which at least one packet of the delay class considered will be forwarded if such a packet is available in the buffer.

12 Claims, 6 Drawing Sheets

METHODS AND DEVICES FOR PRIORITIZING IN HANDLING BUFFERS IN PACKET NETWORKS

BACKGROUND

The present invention is related to methods and devices for prioritizing procedures when handling buffers in packet networks, in particular methods and devices for loss prioritizing and delay prioritizing of data packets.

In packet oriented networks, e.g. ATM (Asynchronous Transfer Mode), data packets or message packets, also called cells, are forwarded between different stations and in particular they pass through switch units or other units, where the arrived packets are forwarded. These transferring stations (most often switches) contain memories or buffers which store the packets before they are forwarded. However the buffers have limited capacities and thus in such systems some method is provided for eliminating certain data package for which there is no space in the buffers.

In order to determine the packets which can be discarded when there is no room in a buffer, the data packets can be assigned loss priorities having different sizes. They are principally a number value indicating the importance of the packet, such that packets having low loss priorities can be eliminated before packets having higher loss priorities.

In such networks it would also be advantageous to have a method by means of which the different data packets are forwarded in such a way that data packets having a high degree of urgency are forwarded in the first place and that data packets having a low degree of urgency in the second place. The degree of urgency can be indicated by assigning to the data packets delay priorities having different values which like the loss priorities are suitably chosen number values. In certain cases several levels having different delay priorities may be provided. The simplest type of queue handling is that first packets are forwarded having the highest priorities and after that, if there are no data packets left in the buffer for the highest priority, data packets having lower priorities can be forwarded. A disadvantage in this procedure may be that messages having low priorities may be allowed to wait too long in the system before they are forwarded.

Thus it would be desirable to have a method by means of which it can be safeguarded, that also for data packets having low degrees of priority a certain minimal capacity in the transfer thereof in the system is warranted.

Further it is advantageous to separate the above mentioned concepts "loss priority" and "delay priority" from each other, such that each data packet thus has both a certain loss priority and a certain delay priority.

In the article "Overload Control in a Finite Message Storage Buffer", San-Qi Li, IEEE Transactions on Communications, Vol. 37, No. 12, December 1989 a method is analyzed for handling a limited buffer memory. In an example, see page 1332, lines 30–36 and other places, there is a buffer having K places and two levels $L_1$, $L_2$, where $L_1 \leq L_2 \leq K$. For filling levels below $L_1$ all messages are always stored, while when the filling level is increasing all messages having low priorities are not stored but are discarded first when the filling level exceeds $L_2$. After this all messages are discarded having low priorities until the filling level has decreased to $L_1$. Apparently also messages having high priorities must be discarded when the filling level is equal to K.

In the European Patent Application EP-A2 0 393 898 a device is provided having a memory for storing data packets having different priority levels. With each priority level a corresponding threshold level is associated. When a packet arrives to be stored in the memory, the packet is discarded, if the filling level exceeds the threshold level associated with the priority level of the packet. Otherwise the data packet is stored in the memory. The memory is cyclic and of type FIFO. It means that in such a device which may be a packet switch it is impossible to also take different delay priorities in the received packet into consideration, such that stored data packets having high delay priorities can be forwarded before packets having low delay priorities.

In the documents U.S. Pat. No. 5,062,106, U.S. Pat. No. 4,942,569, U.S. Pat. No. 4,864,460 and EP-A2 0 368 569 packet switches are disclosed wherein data packets having low loss priorities are discarded before packets having high loss priorities. In these cases there are generally different memories for packets having different delay priorities.

SUMMARY

According to the invention methods and devices are provided of the kind mentioned above, by means of which the problems mentioned above may be solved and the needs mentioned above may be satisfied.

For a data packet which arrives to a node or a switch in a packet network it is assumed, that special information in regard of the handling of the packet is provided in the data packet, such as in a particular header field inside the data packet. This information can be explicitly indicated in a special priority field inside the header field or implicitly indicated by e.g. the channel number of the packet. The information is related to the manner in which the packet is to be handled both in regard of the priority level of the packet, for the case that the receiving buffer already is full, and in regard of the priority, with which the packet is to be forwarded in the case when it has been stored in the buffer. For this suitable circuits are provided for reading this information in the packet. The information is used in one place by logical circuits handling the message which possibly discard it for the case that the loss priority, which is indicated in the data packet or is valid for the data packet, means, that the packet may be lost if the buffer is too full. Other logical circuits perform the queue handling of the packets stored in the buffer and forward them in an order which is determined by the loss priority, in regard of which the circuits get information from the packet itself.

The packets to be stored are stored in a common buffer for all packets, e.g. in the succession order in which they are received or preferably in some suitable free place in the buffer. In each moment a certain filling level M can be determined indicating the number of packets being stored in the buffer. The buffer is provided with certain threshold values which are associated with the different priorities of the packets in regard of the loss thereof. The filling level is thus indicated for all stored packets totally. They can have different loss priorities and delay priorities.

In order to be able to know the places there the arrived data packets are stored in the buffer, logical queues are arranged. They are memory circuits looking after the places where the packets are located and thus contain the addresses to the packets. The packets belong to different delay priority classes which indicate the velocity or the priority with which the messages are to be sent from the buffer. The queue handling unit can then e.g. contain lists of addresses to packets having different delay priorities.

The forwarding of messages may be performed, according to what has been discussed above, in such a way that packets having the highest priorities are always sent first until there are no packets having these priorities left in the buffer, and after that data packets having the next highest priority, etc. A possibility when two different delay priority classes are provided, is to arrange a certain least frequency for forwarding messages having a lower delay priority level. It can be performed, such that the logical circuits handling the forwarding take care that at least one message having the lower delay priority is forwarded during each time interval having a predetermined length, if such a packet is available for forwarding.

By the separation described above of loss priorities and delay priorities with a common buffer for the data packets and logical queues in the shape of address lists with addresses in a succession order corresponding to the arrival order of the packets, for the different delay priorities, a method is obtained for handling the buffer which is suitable for evaluation by means of mathematical methods and thus it has rather predictable properties.

In the ATM networks a contract is established between the user of a connection and the network distributor during the coupling phase for establishing the connection. This contract specifies the properties of the data flow of the connection and a specified quality in regard of cell loss, delay and variation of the delay is also a part of said contract. It is therefore of a primary importance that the network operator can predict the quality of the links on which the connection is established. An estimation of the proportion of lost information is performed by applying queue theory and in order to satisfy the further requirement of a small time consumption for the establishment of the connection approximations are needed to the more accurate queue theories. The group of queue models, in which the information is managed at each instant when the queue is not empty, can be handled with modern queue theory, also for rather complicated arrival procedures. Queue models, in which the time periods, when the queue is not empty and no information is processed, are however in themselves difficult to analyze also for the simplest arrival procedures. With only one buffer for all data packets and different threshold values such an easily handled case is obtained with a continuous processing of the single queue formed by the buffer itself, while with queues for different delays, each one of which has threshold values for different loss priorities, queues having a low delay priority can remain not processed and thus a case is obtained which according to the above is difficult to analyze.

BRIEF DESCRIPTION OF THE DRAWINGS

The invention will now be described as a not limiting exemplary embodiment with reference to the accompanying drawings wherein FIG. 1 schematically shows a network for the transfer of data packets, FIG. 2 schematically shows an embodiment of a unidirectional switch unit in such a network and having only output buffers, FIG. 5 is a flow chart of a Discard_Logic process;

FIG. 6 is a flow chart of a Receive process;

FIG. 7 is a flow chart of a Scan1 process;

FIG. 8 is a flow chart of a Scan2 process; and

FIG. 9 is a flow chart of a Drain Queue process.

DETAILED DESCRIPTION

Figure 1:
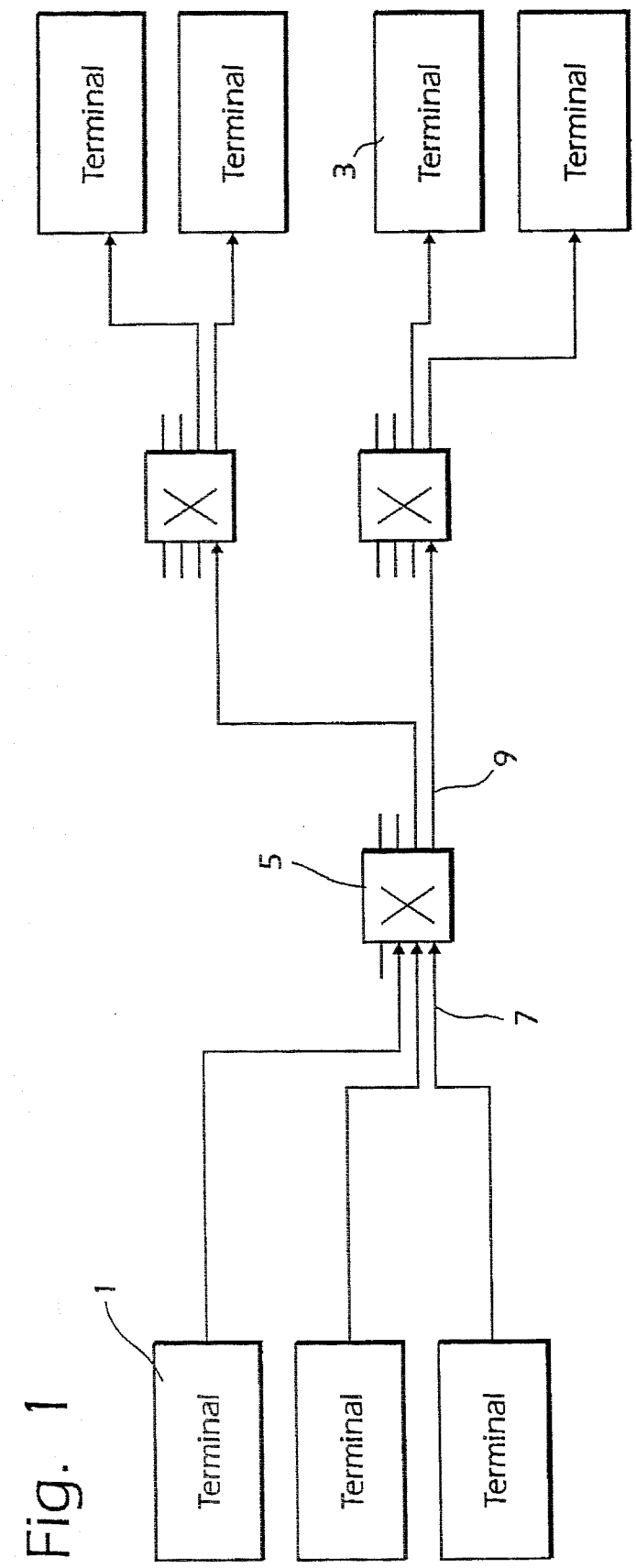

In FIG. 1 a net is illustrated for the forwarding of packets from source terminals 1 to destination terminals 3. On their way between the source and the destination the data packets pass switch stations 5 having a number of input lines 7 and output lines 9. In the switch units 5 in the usual way a transfer of a data packet or a message is performed to a selected output.

Figure 2:
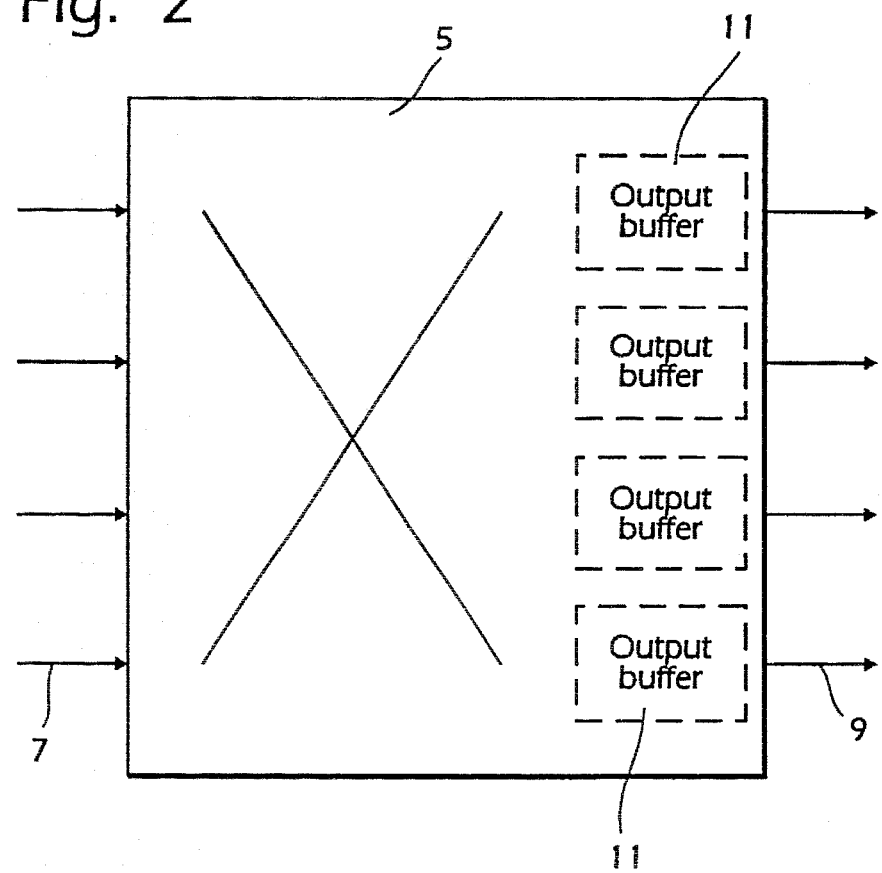

In FIG. 2 a switch unit 5 is schematically shown. It contains in addition to many other functions circuits for the transfer of a data packet from an input line 7 to an output line 9, where the output line valid for this packet e.g. in some way can be derived from information contained in the data packet by means of some kind of address therein. Before the data packet can be forwarded from the unit 5, it is stored in an output buffer 11 for each output line and the handling of the data packet at its arrival to the output buffer 11 and when it is forwarded from the buffer and thus from the switch unit 5 as a whole is performed by particular circuits according to the invention.

Figure 3:
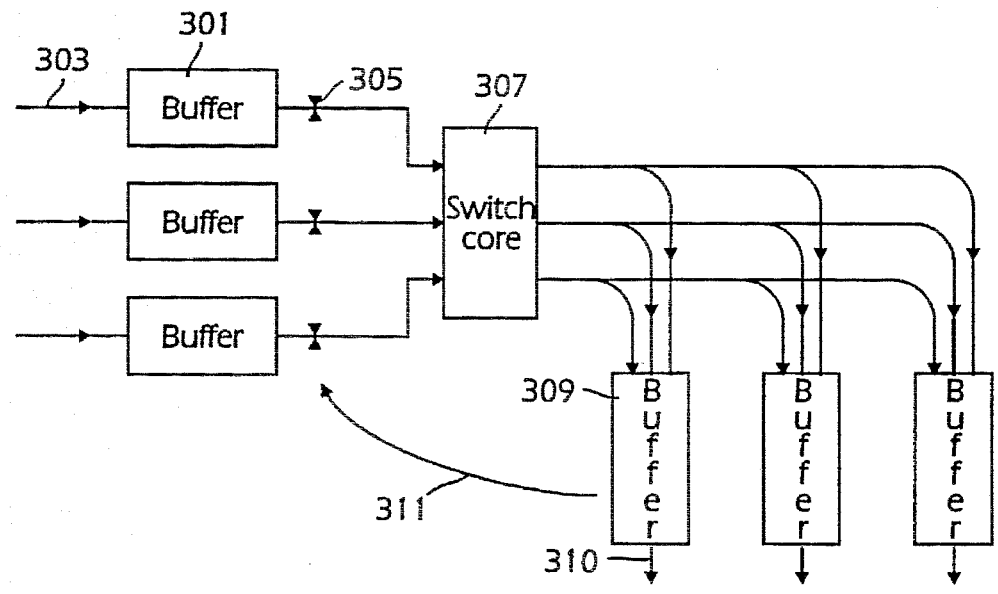
FIG. 3 shows a more complicated embodiment of a unidirectional switch unit having both input buffers and output buffers.

A type of switch unit, which is described in the U.S. patent application Ser. No. 07/990,511, filed Dec. 15, 1992, now abandoned, for Ljungberg et al., which corresponds to European Patent Publication No. 0 674 821, is schematically illustrated in FIG. 3. The switch comprises input buffers 301, to which incoming lines or links 303 are connected. Packets arriving to the switch are first intermediately stored first in these input buffers 301. On the output lines of the buffers 301 throttle devices 305 are arranged controlling the flow of data packets from the buffers to a switch core 307, in which data packets are transferred to the intended output lines. At the output lines the packets are intermediately stored a second time in output buffers 309, before they are forwarded from the switch on outgoing lines or links 310. A control signal, indicated with an arrow 311, is supplied to the throttle devices 305 from the output buffers 309. The administration of the reading into and from each buffer, both the input buffers 301 and the output buffers 309, in regard of loss of data packets and the forwarding from the buffer with consideration of the varying degree of urgency of the data packets as to the delay in the transfer of packet through the network and in particular through the switch, can be performed by particular circuits according to the invention.

Figure 4:
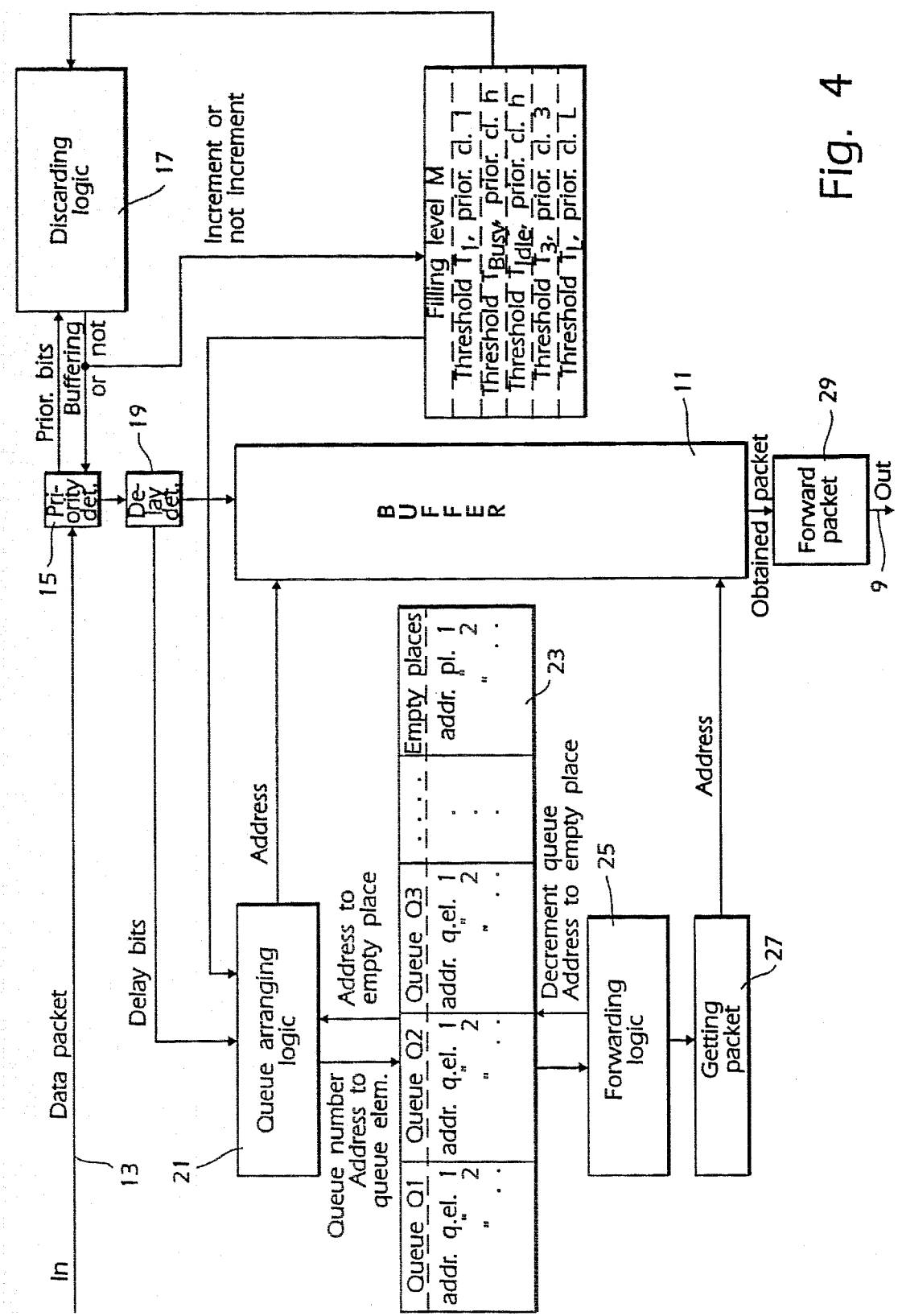
FIG. 4 shows a block diagram of the handling of the buffer in such a switch unit.

The detailed construction and function of these particular circuits appear from FIG. 4. On an input line 13 a data packet arrives. In the block 15 is information taken from the packet in regard of the priority which data packet has as to a possible loss. This information, e.g. in the shape of one or several priority bits or binary digits, is transferred to discarding logic 17, which performs the logical choice if the packet is to be stored or possibly be discarded.

In order to perform it the discarding logic first determines the class, to which the packet belongs in respect of this type of priority. The belonging to a class may be indicated either explicitly or implicitly. In the explicit case the loss priority class is directly indicated inside the packet, e.g. in a header field therein. An implicitly indicated loss priority class can be obtained from the knowledge of the channel to which the packet belongs. A number of different such priority class may be provided, e.g. class 1, class 2 and h with hysteresis, class 3, class 4, ..., class 9 and class L. The latter class has the lowest priority in regard of a possible loss for storing in the buffer 11.

To each class generally only one threshold value is associated like $T_1, T_3, T_4, \ldots$ and $T_L$. For all classes except the class with hysteresis said threshold values indicate a filling level in the buffer 11, over which messages belonging to the respective class not will be stored in the buffer but simply neglected or discarded. For the highest priority class 1 the threshold value $T_1$ obviously is equal to the highest possible filling level of the buffer.

For messages belonging to the hysteresis class h the discarding procedure is somewhat more complicated. For this class there are two threshold values $T_{Busy}$ and $T_{Idle}$, where $T_{Busy}$ is larger than $T_{Idle}$. When data packets having this priority class are received, they are stored in the buffer until the threshold value $T_{Busy}$ has been reached. Then no more packets are stored belonging to this priority class until the filling level in the buffer 11 is lower than the low threshold value $T_{Idle}$.

The discarding logic 17 also reads the present filling level M in the buffer 11, i.e. the total number of data packets which exactly at this instance are stored in the buffer. By means of this information the discarding logic 17 then determines, if the message is to be stored in the buffer and in such a case sends a message thereof to the block 15, which then will forward the information to a block 19.

The data packets which are to be stored in the buffer are further read in next block 19 and from the packet information is obtained in respect of the delay priority which has been assigned to the packet. Thus there can be different delay classes 1, 2, 3, etc, arranged in an order, such that packets belonging to the delay class 1 will enjoy the least delay, packets belonging to the class 2 more delay, i.e. are to be forwarded in the second place, etc. The queue arranging logic 21 thus registers the delay priority number of the packet and further places the address of this data packet in the buffer in address lists in a queue memory 23. A number of logical queues are formed in this way, while the data packets in the buffer 11 actually are stored in an arbitrary order. In order to get access to the address at which the present packet is to be stored, e.g. information of the address to a free place in the buffer is fetched to the queue arranging logic from a special list arranged within the queue memory 23.

Packets are forwarded with a certain frequency from the buffer and in order to handle the order, in which the data packets are to be sent, forwarding logic 25 is arranged. The forwarding logic 25 thus determines the logical queue, from which the next data packet is to be forwarded. It is performed by the forwarding logic by checking in the simplest way if there is any packet in the queue 1 or $Q_1$ having the highest delay priority and if such a packet is there, it is to be sent. If there is no such packet, it is checked if the queue $Q_2$ contains any data packet which is to be sent. If there is such a data packet, it is forwarded and if there is none, the queue $Q_3$ is checked in the same way, etc.

When the forwarding logic 25 has determined the packet, which is to be forwarded, or more correctly the queue, from which it is to be taken, the corresponding address is obtained from this queue and the number of packets in this queue is reduced by 1. The forwarding logic then transfer the address of this data packet which is to be sent to a block 27, which sends the address to the buffer 11. The corresponding data packet is fetched from the buffer and is sent to a forwarding unit 29 from which the data packet is forwarded. From the forwarding unit 29 data packets are in this way forwarded at regular time intervals $\Delta t$ to the output line 9.

When the packet is fetched from the buffer, the filling level M is also reduced by 1 and the address of the packet is eliminated from the respective queue and is written into the list of addresses to free places in the buffer.

The procedural methods illustrated with reference to FIG. 4 will also be explained by means of a description in pseudocode. By means of the pseudocode the procedures may be easily carried out by means of hardware or software. In the pseudocode description it is supposed that the number of priority levels or priority classes in regard of loss of packets is L and that the number of delay priority levels, delay priority classes or logical queues is D.

The procedural methods can be divided into different procedures which are executed in parallel inside the processor. The discarding logic 17 corresponds to a procedure Discard_Logic and it thus handles the prioritizing as to a possible loss of the data packet. The filling level M corresponds to a variable Queue_Length. CLP indicates the information of loss priority class which is obtained explicitly or implicitly from the received data packet.

```
Process Discard_Logic
State := Idle
begin
    repeat
        await(arrival of cell)
        case of CLP = L then
        begin
            if Queue_Length > T_L then
                "Discard the received cell"
            else
                "Buffer the received cell"
                Queue_Length := Queue_Length + 1
        end;
        .
        .
        .
        case of CLP = 3 then
        begin
            if Queue Length > T_3 then
                "Discard the received cell"
            else
                "Buffer the received cell"
                Queue_Length := Queue_Length + 1
        end;
        case of CLP = 2 then                    :Hysteresis
        begin
            if State = Busy then
                if Queue_Length < T_Idle then
                    "Buffer the received cell"
                    Queue_Length := Queue_Length + 1
                else
                    "Discard the received cell"
            else                                :State = Idle
                if Queue_Length > T_Busy then
                    "Discard the received cell"
                else
                    "Buffer the received cell"
                    Queue_Length := Queue_Length + 1
        end;
        case of CLP = 1 then        :Highest loss priority
        begin                       :T_1 = maximal number of
            if Queue_Length > T_1 then  :cells in buffer
                "Discard the received cell"
            else
                "Buffer the received cell"
                Queue_Length := Queue_Length + 1
        end;
```

```
        if Queue_Length > T_Busy then
            State := Busy
    forever
end;
```

Figure 5:
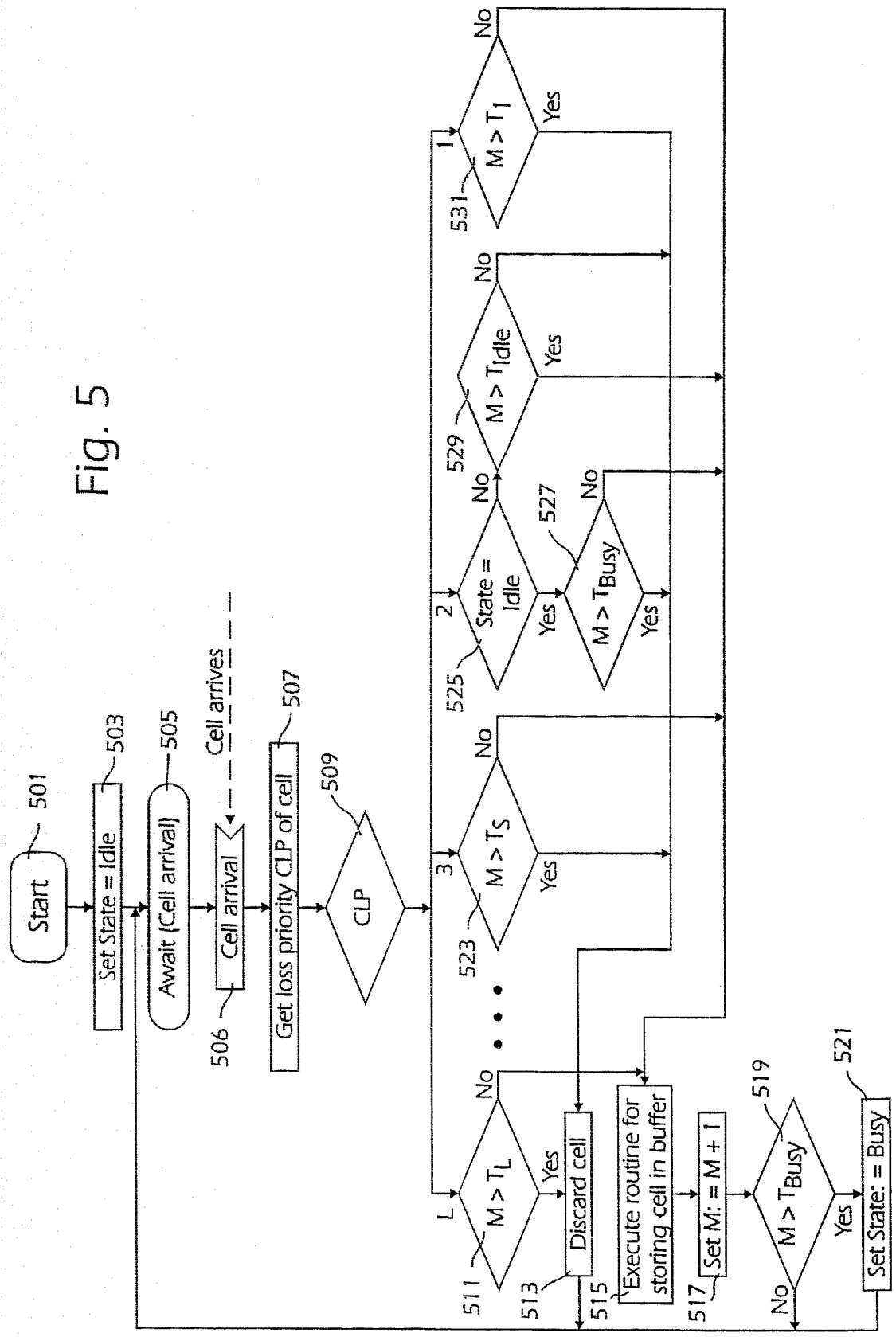
FIGS. 5–9 show flow diagrams for various subprocedures for storing and forwarding in particular.

This procedure is illustrated in the flow diagram in FIG. 5. It starts in a start block 501, after which in a block 503 a variable "State", which is needed for handling the delay priority class 2 or h with hysteresis, is set to a constant= "Idle". After this the procedure waits in a block 505 that a new packet or cell will arrive. The arrival of a new cell is detected in a block 505 and when a cell has arrived, in a block the loss priority of this cell is determined, the value of which is given by the variable CLP. Then in a block 509 the loss priority value CLP is tested against the different possible values thereof.

If CLP has the value "L" (the lowest loss priority), it is determined in a block 511, if the filling level M in the common buffer is larger than $T_L$. If it is true, the cell is discarded in the block 513, after which the procedure returns to the block to await the arrival of a new cell. If it in the block 511 instead was determined that the filling level M is smaller than the corresponding threshold value $T_L$, the cell is stored in the common buffer in the block 515 and the filling level is incremented in the block 517. When thus a cell is stored in the buffer, it is tested in the block 519, if the filling level M now has passed the upper limit $T_{Busy}$ for the delay priority class 2 or h with hysteresis. If this is the case, in a block 521 the variable "State" is set to the value "Busy". Then the procedure returns to the block 505 to await the arrival of a new cell.

If it was determined instead in the block 509, that CLP has the value 3, it is tested in a block 523 whether the filling level M in the common buffer is larger than the associated threshold value $T_3$. If it is true, the cell is discarded as above in the block 513, after which the procedure returns to the block 505 to await the arrival of a new cell. If it was determined instead in the block 523, the filling level M is smaller than $T_3$, the procedure continues as above to the block 515 for the storing of the cell in the common buffer, after which the procedure is continued as above after the block 515.

If it in the block 509 was determined instead, that CLP has the value 2, which means that the cell belongs to the delay priority class h with hysteresis, it is tested in a block 525, if the variable "State" has the value "Idle". If it is true, it is determined in a block 527 if the filling level M of the buffer is larger than the upper threshold value $T_{Busy}$ for this class. If the filling level is larger than the threshold value, then the cell is to be discarded and the procedure proceeds to the block 513 as above. If the filling level is lower than $T_{Busy}$, instead the cell is to be stored and then the procedure continues to the block 515 as above. If it was decided instead in the block 525 that the variable "State" has not the value "Idle" (it has then the value "Busy"), it is determined in a block 529 if the filling level is lower than the low threshold value $T_{Idle}$. If it is not the case, the cell is to be discarded and the procedure continues as above to the block 513. Otherwise the cell is to be stored and the procedure continues to the block 515 as above.

If it was decided in the block 509 instead that CLP has the value 1, i.e. that the cell has the highest priority and thus desirably should not be lost, it is determined in a block 531 whether the filling level M in the common buffer is larger than the associated threshold value $T_1$. If it is true, the cell must be discarded and the procedure then continues as above to the block 513. Otherwise the cell is to be stored in the common buffer and the procedure continues as above to the block 515.

Further there is a, procedure Receive which performs the queue arranging logic 21. DP here indicates the information in regard of the delay class of the priority. This process corresponds to the block 515 of FIG. 5.

```
Process Receive
begin
    repeat
        await(Request of Buffering of cell from Discard_Logic)
        "write cell into Buffer_Element"
        case DP = 1 then
            "link Buffer_Element to Queue1"
        case DP = 2 then
            "link Buffer_Element to Queue2"
            .
            .
            .
        case DP = D then
            "link Buffer_Element to QueueD"
    forever
end;
```

Figure 6:
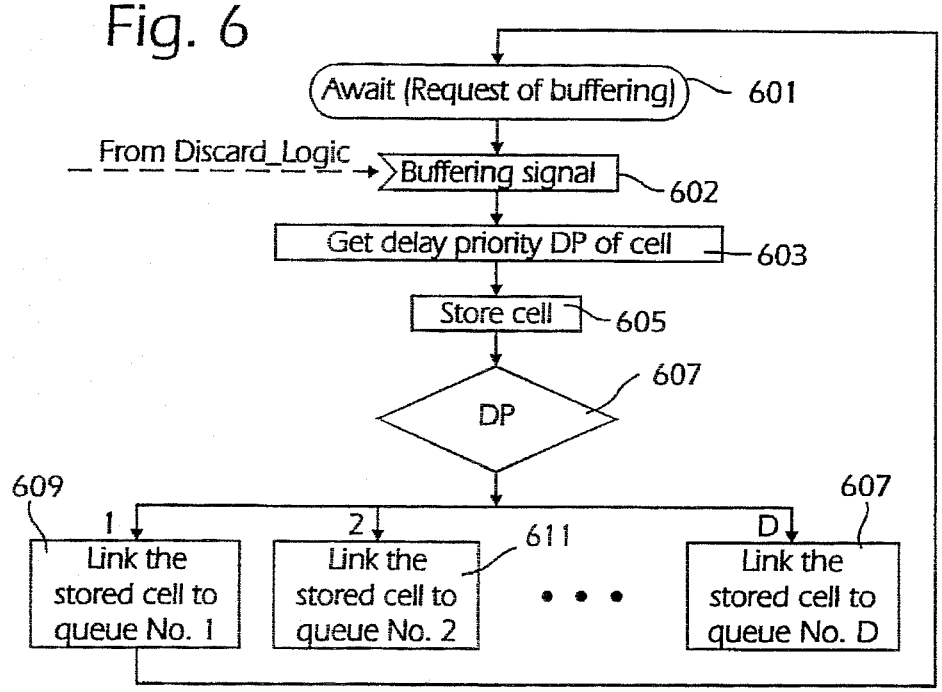

The corresponding flow diagram is illustrated in FIG. 6 and there, in a block 601 it is awaited that a cell is to be stored. In a block 602 a signal is received and detected from the procedure Discard_Logic described above that the cell is ready to be stored. When thus a cell is to be stored in the common buffer, it is determined in a block 603 the value DP which indicates the delay priority of the cell. After that the cell is stored in the common buffer in the block 607. Then the value DP is tested in a block 607 in respect of its different possible values. If thus DP has the value 1, in a block 609 the stored cell is linked to the corresponding queue number 1, by storing the address of the cell last in this queue. Then it is again awaited in the block 609 that a new cell is to be stored. If it was determined in the block 607 that DP has the value 2, in a block 611 the stored cell is linked as above to queue No. 2, after which the procedure continues to the block 601 and waits for a new cell to store. It is performed in the same way for all queues and at last it is tested in the block 607 whether DP has the value D. If it is the case, as above in a block 613 the stored cell is linked to queue No. D, after which the procedure continues to the block 601 waiting for a new cell to store.

The procedure Scan1 corresponds substantially to the forwarding logic 25 described above and it forwards a packet with a time interval $\Delta t$, which thus is the transmission time of a cell or a packet. The pseudo code thereof is:

```
Process Scan1
begin
    repeat
        wait (Timeinterval Δt)
        if Queue 1 not empty then
            "Send cell from queue 1 "
        else if Queue2 not empty then
            "Send cell from queue 2"
            .
            .
            .
        else if QueueD not empty then
            "Send cell from queue D"
    forever
    end;
```

Figure 7:
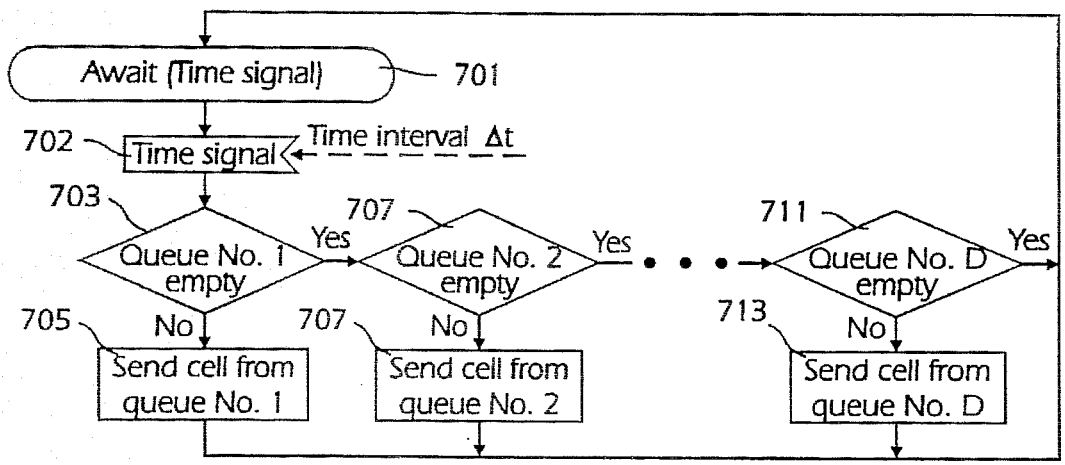

The corresponding flow diagram is shown in FIG. 7. Here in a block 701 is awaited, that a signal will arrive to indicate, that the time Δt has elapsed from the next earlier execution of the procedure. A signal thereof is received and detected in a block 702. When the signal is detected and the time Δt thus has elapsed, in a block 703 it is determined whether queue No. 1 is empty. If it is not the case, a cell can be forwarded from this queue and it is performed in a block 705, after which the procedure continues to the block 701 to await that the time Δt has elapsed. If in the block 703 it is decided instead that queue No. 1 is empty, it is tested in a block 707, if queue No. 2 is empty. If it is not true, the procedure continues to a block 709 and there forwards a cell from queue No. 2. Then the procedure continues as above to the block 701 to await that the time Δt has elapsed. If it is decided instead in the block 707 that queue No. 2 is empty, this procedure is repeated for the next queue in the same way. If all earlier queues have proved to be empty, the procedure continues to a block 711 to decide if also the last queue No. D is empty. If there is a cell in queue No. D, in a block 713 a cell waiting for its turn in the queue No. D is forwarded. Then the procedure continues as above to the block 701 to await that the time Δt has elapsed.

The procedure Drain_Queue reduces the filling level M, which in the various procedures is called Queue_Length, by one after each predetermined time interval Δt. It is performed quite in parallel to the process Scan1 and may also be contained therein if the processing times are sufficiently small.

```
Process Drain_Queue
begin
  repeat
    wait (Timeinterval Δt)
    if Queue_Length > 0 then
      Queue_Length := Queue_Length – 1
    if Queue Length < T_Idle then
      State := Idle
  forever
end;
```

Figure 9:
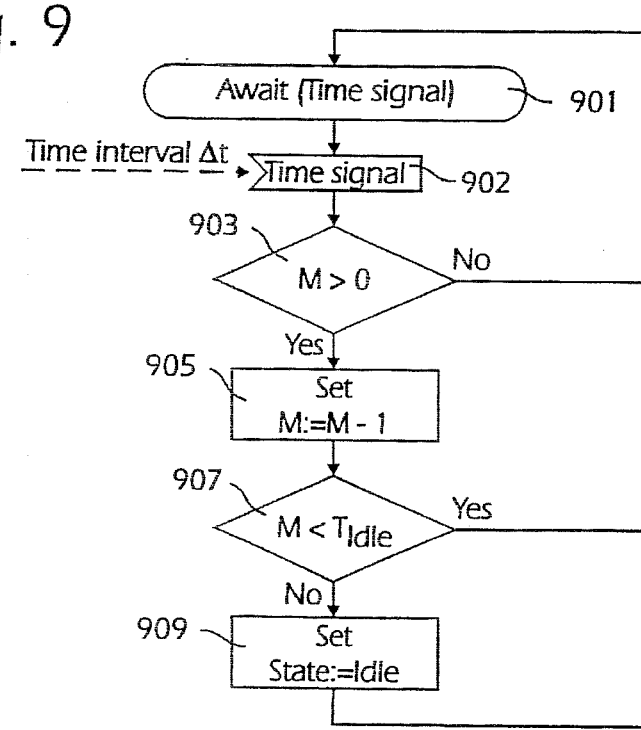

The corresponding flow diagram is shown in FIG. 9. Here is awaited, as in the process Scan1, in a block 901, that a time signal will be received, indicating that the time interval Δt has elapsed, and it is detected a block 902. When thus the time signal is detected, it is determined in a block 903, whether the buffer is not empty, i.e. if M>1. If the buffer is empty, the filling level cannot be reduced and then the procedure continues to the block 901. If it is decided in the block 903 instead that there are cells in the common buffer, the filling level is reduced in the block 905. After that it is decided in a block if the filling level has decreased below the lower hysteresis level $T_{Idle}$. If the filling level is decreasing and this condition is satisfied, the hysteresis state "State" is to be changed to "Idle" and it is performed in a block 909. After that the procedure continues to awaiting a new time signal in the block 901. If it was decided in the block 907, that the filling level was not lower than $T_{Idle}$, the procedure also continues to the block 901 to await a new time signal.

Further there is an alternative to the forwarding logic described above and therefor there is a process Scan2, which is shown when there is only two logical queues $Q_1$ and $Q_2$ for the data packets.

```
Process Scan2
begin
  repeat
    wait (Timeinterval Δt)
    if Interval > T then
      Interval := 0
      if Queue2 not empty then
        "send cell from Queue2"
      else if Queue1 not empty then
        "send cell from Queue1"
    else
      if Queue1 not empty then
        "send cell from Queue1"
        Interval := Interval + Increment
      else
        Interval := 0
        if Queue2 not empty then
          "send cell from Queue2"
  forever
end;
```

In this procedure Scan2 it is looked after that within each time interval having the length T at least one element is forwarded from the low prioritized queue $Q_2$ if such an element here is available. It is performed by the fact that the forwarding logic 25 at each forwarding instance checks whether the time period "Interval" from the time when a packet from the queue $Q_2$ was last forwarded, is. larger than T and if it is true and the queue $Q_2$ is not empty, a packet is forwarded from this low prioritized queue. Otherwise packets are forwarded from the higher prioritized queue $Q_1$. If instead the time interval "Interval" is not larger than T, packets are sent from the queue having the high priority and the interval "Interval" is incremented by a suitable entity. If the queue $Q_1$ in this latter case is empty, the variable "Interval" is set to 0 and the queue $Q_2$ is serviced.

Figure 8:
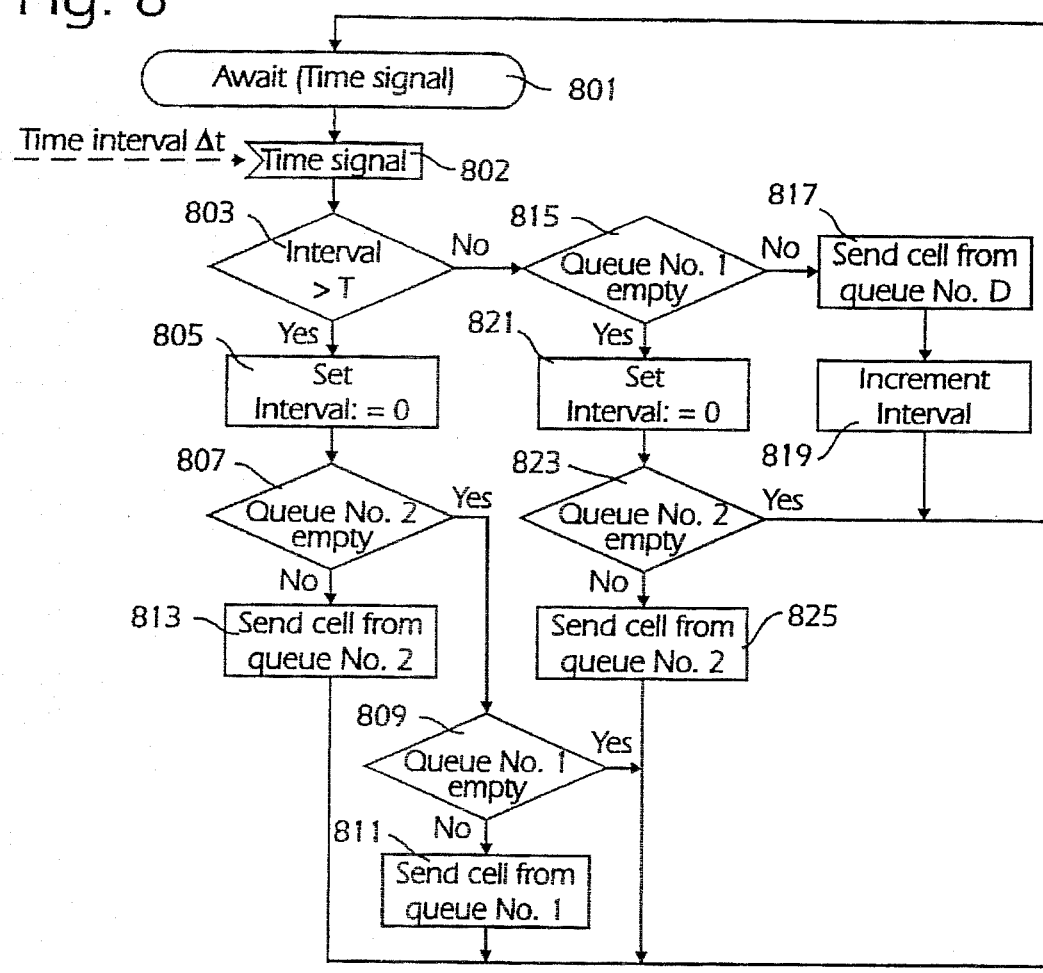

The corresponding flow diagram is shown in FIG. 8. As in the procedure Scan1 in blocks 801 and 802 respectively the time signal is awaited and detected that the time period Δt has elapsed. When a signal thereof is detected, it is decided in a block 803, whether the time interval "Interval" is larger than the predetermined time value T. If it is decided to be the case, a possibility will be offered to forward a cell from queue No. 2. Then the variable "Interval" is first set equal to zero in a block 805, since now the queue No. 2 is being serviced. After that it is tested in a block 807 whether queue No. 2 is empty. If this proves to be the case, no cell can be forwarded from queue No. 2 and therefore the procedure continues to a block 809 in order to examine if queue No. 1 is empty. If it is true, there is no cell to forward and the procedure returns to the block 801 to await a new time signal. If queue No. 1 is not empty, instead a cell is sent from this queue in a block 811 and then the procedure continues again to the block 801.

If it resulted in the block 807, that queue No. 2 is not empty, a cell is forwarded from this queue in a block 813, after which the procedure returns to the block 801.

If it was decided instead in block 803 that the time "Interval" had not elapsed, i.e. it was not larger than T, principally the procedure Scan1 described above is to be executed and then the procedure continues to a block 815 in order to test if queue No. 1 is empty. If it is not the case, a cell can be forwarded from this queue and it is performed in a block 817. After that the variable "Interval" is incremented in the block 819, after which the procedure returns to waiting in the block 801. If it instead was decided in the block 815, that queue No. 1 is empty, queue No. 2 will then be offered a possibility to forward a cell. Therefore the variable "Interval" is then set to zero in a block 821, after which it is determined in a block 823 whether queue No. 2 also is empty. If this condition is satisfied, the condition returns to the waiting state in the block 801 as above. Otherwise a cell can be sent from queue No. 2 and it is executed in a block 825. After this the procedure returns to waiting for a new time signal in the block 801.

The invention can be modified in many ways as is obvious to one skilled in the art. All these modifications are comprised by the invention, however, the scope of which is set out by the appended claims.

We claim:

1. A method for handling in a packet network a buffer, in which arrived packets are stored before they are forwarded, in particular in a switch device, each packet belonging to a certain loss priority class of at least two loss priority classes and each packet also belonging to a certain delay priority class of at least two delay priority classes, the delay priority classes being intended to give different delays for the packets belonging to said classes, such that longer delays are allowed for packets belonging to delay priority classes having a lower delay priority, the method comprising, for each arrived packet, the following steps:

a) determining the loss priority class of the packet, b) determining whether the present total number of packets stored in the buffer is smaller than a threshold value associated with the loss priority class of the packet, c) if the determination in b) gives the answer yes, storing the packet in the buffer and otherwise discarding the packet, for each arrived packet also determining the delay priority class of the packet and in forwarding packets from the buffer, choosing packets belonging to a higher delay priority class before packets belonging to a lower delay priority class.

2. A method for handling in a packet network a buffer, in which arrived packets are stored before they are forwarded, in particular in a switch device, each packet belonging to a certain loss priority class of at least two loss priority classes and each packet also belonging to a certain delay priority class of at least two delay priority classes, the delay priority classes being intended to give different delays for the packets belonging to said classes, such that longer delays are allowed for packets belonging to delay priority classes having a lower delay priority, the method comprising, for each arrived packet, the following steps:

a) determining the loss priority class of the packet, b) determining whether the present total number of packets stored in the buffer is smaller than a threshold value associated with the loss priority class of the packet, c) if the determination in b) gives the answer yes, storing the packet in the buffer and otherwise discarding the packet, for each arrived packet also determining the delay priority class of the packet and in forwarding packets from the buffer, choosing packets belonging to a higher delay priority class before packets belonging to a lower delay priority class wherein with each lower delay priority class time intervals having predetermined lengths are associated, such that a packet from a lower delay priority class is chosen instead of a packet from a higher delay priority class, if no packet from the lower delay priority class has been sent during the time interval having the predetermined length associated with the delay priority class thereof and if such a packet is available.

3. A device for handling in a packet network a buffer memory, in which arrived packets are stored before they are forwarded, in particular in a switch device, each packet belonging to a certain loss priority class of at least two loss priority classes and a threshold value being associated with each loss priority class, each packet also belonging to a certain delay priority class of at least two delay priority classes, the delay priority classes being intended to allow different delays for the packets belonging to said classes, such that longer delays are allowed for packets belonging to delay priority classes having a lower delay priority, the device comprising an input on which the arrived packets arrive, the buffer memory, an output on which arrived packets are forwarded, a logic unit for determining those packets to be stored in the buffer memory comprising a) means for determining the loss priority class of an arrived packet, b) means for determining if the present total number of packets stored in the buffer memory is less than the threshold value associated with the loss priority class of the arrived packet and for forwarding, when this condition is satisfied, a signal thereof to c) means for storing the arrived packet in the buffer memory, and d) means for determining for each arrived packet the delay priority class of the arrived packet and another logic unit for determining which packet is to be sent from the buffer memory comprising means for choosing packets belonging to a higher delay priority class before packets belonging to a lower delay priority class and for transferring the selected packets to the output for forwarding.

4. A device for handling in a packet network a buffer memory, in which arrived packets are stored before they are forwarded, in particular in a switch device, each packet belonging to a certain loss priority class of at least two loss priority classes and a threshold value being associated with each loss priority class, each packet also belonging to a certain delay priority class of at least two delay priority classes, the delay priority classes being intended to allow different delays for the packets belonging to said classes, such that longer delays are allowed for packets belonging to delay priority classes having a lower delay priority, the device comprising an input on which the packets arrive, the buffer memory, an output on which the packets are forwarded, a logic unit for determining those packets to be stored in the buffer memory comprising a) means for determining the loss priority class of an arrived packet, b) means for determining if the present total number of packets stored in the buffer memory is less than the threshold value associated with the loss priority class of the arrived packet and for forwarding, in the case that this condition is satisfied, a signal thereof to c) means for storing the arrived packet in the buffer memory, and d) means for determining for each arrived packet also the delay priority class of the packet and another logic unit for determining which packet is to be sent from the buffer memory comprising means for choosing packets belonging to a higher delay priority class before packets belonging to a lower delay priority class wherein each lower delay priority class is associated with time intervals having predetermined lengths, such that instead of a packet from a higher delay priority class a packet is chosen from a lower delay priority class if no packet from the lower delay priority class has been forwarded during the time interval with the predetermined length associated with the delay priority class thereof and if such a packet is available, and means for transferring a chosen packet to the output for forwarding.

5. A method for handling in a packet network a buffer, in which arrived data packets are stored before they are forwarded, each packet belonging to a respective one of at least two delay priority classes, comprising the step of, in forwarding packets from the buffer, choosing packets belonging to a higher delay priority class before packets belonging to a lower priority class wherein each lower delay priority class is associated with time intervals having predetermined lengths, such that instead of a packet from a higher delay priority class a packet is chosen from a lower delay priority class, if no packet from the lower delay priority class has been sent during the time interval having the predetermined length associated with the delay priority class thereof and if such a packet is available.

6. A device for handling in a packet network a buffer memory, in which arrived packets are stored before they are forwarded, each packet belonging to a respective one of at least two delay priority classes, comprising an output on which the packets arrive, the buffer memory, an output on which the packets are forwarded from the buffer memory, a logic unit for determining which packet is in turn to be forwarded from the buffer memory, comprising means for choosing packets belonging to a higher delay priority class before packets belonging to a lower delay priority class wherein each low delay priority class is associated with time intervals having predetermined lengths, such that instead of a packet from a higher delay priority class a packet is chosen from a lower delay priority class, if no packet from the lower delay priority class has been sent during the time interval having the predetermined length associated with the delay priority class thereof and if such a packet is available, and means for transferring the chosen data packet to the output for forwarding.

7. A device according to claim 6, further comprising memory means associated with each delay priority class for storing addresses to the data packets which belong to this delay priority class and which are stored in the buffer.

8. A device according to claim 7, further comprising queue arranging means for storing, for arrived data packets, which are stored in the buffer memory, the addresses to these data packets in the corresponding memory means associated with the delay priority class, to which each data packet belongs, and for further placing the addresses to stored data packets belonging to a delay priority class in a definite order in the memory means associated with this delay priority class.

9. A device according to claim 8, wherein the queue arranging means places addresses, in a sequential order, which corresponds to a time order, in which the data packets having these addresses have arrived.

10. A device for handling in a packet network a buffer memory, in which arrived packets are stored before they are forwarded, each packet belonging to a respective one of at least two delay priority classes, comprising an output on which the packets arrive, the buffer memory, an output on which the packets are forwarded from the buffer, a logic unit for determining which packet is in turn to be forwarded from the buffer memory, comprising means for selecting packets belonging to a higher delay priority class before packets belonging to a lower delay priority class based on lists stored in a memory for each delay priority class, each list accommodating addresses to the data packets, which belong to this delay priority class and which are stored in the buffer memory, and means for transferring a chosen data packet to the output for forwarding.

11. A device according to claim 10, further comprising queue arranging means for storing, for arrived data packets, which are stored in the buffer memory, the addresses to these data packets in the corresponding memory associated with the delay priority class, to which each data packet belongs, and for further placing the addresses to stored data packets belonging to a delay priority class in a definite order in the memory associated with this delay priority class.

12. A device according to claim 11, wherein the queue arranging means places addresses, in a sequential order, which corresponds to a time order, in which the data packets having these addresses have arrived.

* * * * *